Patented Feb. 11, 1930

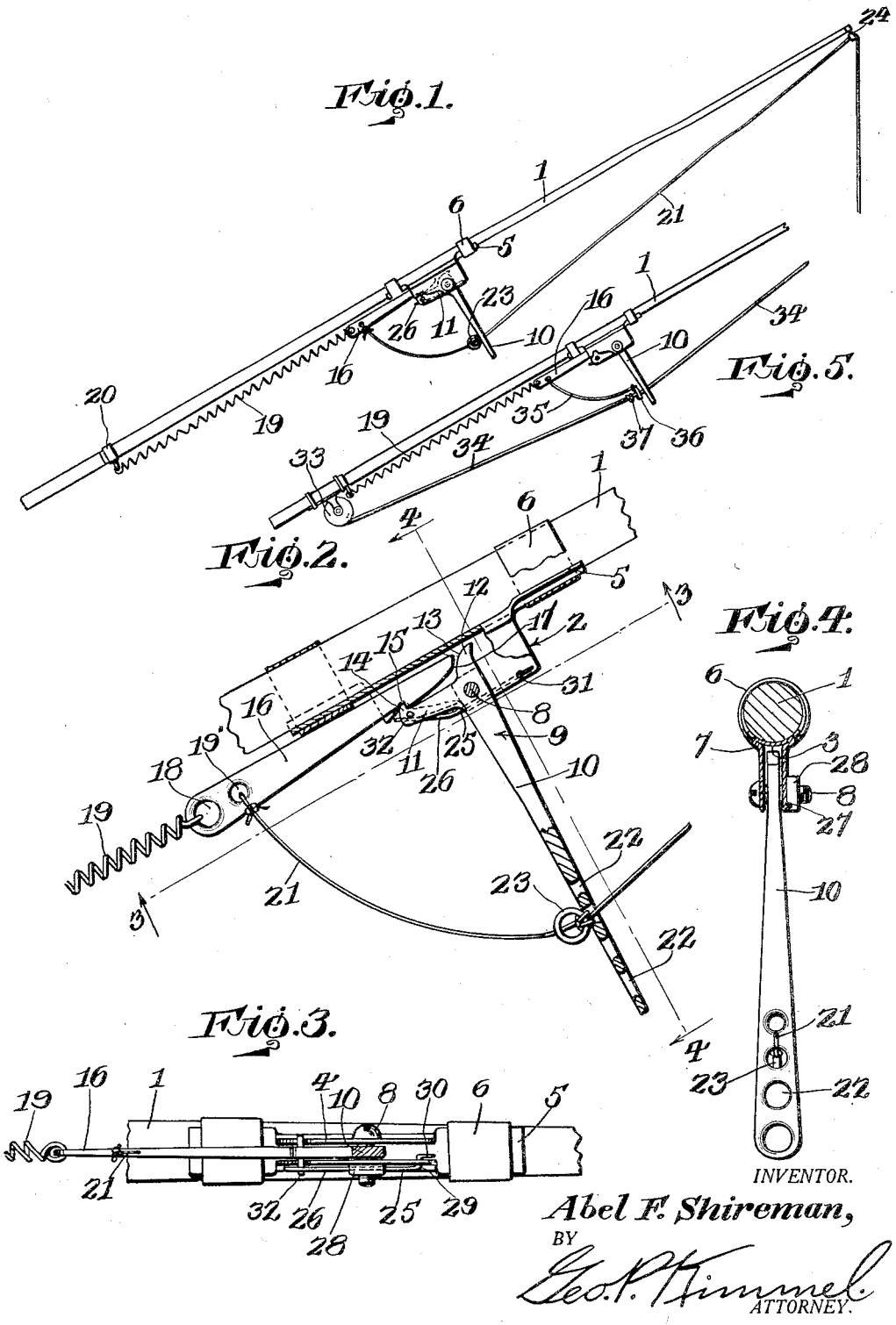

1,747,033

UNITED STATES PATENT OFFICE

ABEL F. SHIREMAN, OF VANCOUVER, WASHINGTON

FISH CATCH

Application filed January 9, 1929. Serial No. 331,208.

This invention relates to a fish catch and has for its primary object to provide, in a manner as hereinafter set forth, a tension and trigger mechanism adapted for connection with a fish line and pole whereby a strike on the hook carried by the line will cause the latter to be automatically jerked to hook the fish making the strike.

A further object of the invention is to provide a device as aforesaid, by means of which a fish line with which the device is associated may be anchored to a fish pole with a quality of elasticity, thereby minimizing the danger of the line being broken in the effort of landing a fish.

Another object of the invention is to provide, in a manner as hereinafter set forth, a trigger mechanism for association with a fish line and adapted to be secured to a fish pole for engagement with a spring actuated latch member to which the fish line is secured, whereby a strike on the hook carried by the line operates the trigger to release it from engagement with the latch member, thereby causing the spring to exert a jerking action on the line.

With the foregoing and other objects in view, the invention consists of the novel construction, combination and arrangement of parts as hereinafter more particularly described, and as illustrated in the accompanying drawings wherein is shown a preferred embodiment of the invention, but it is to be understood that such drawings and description are to be taken as illustrative and that the invention is intended to be limited only by the scope of the claims hereunto appended.

In the accompanying drawings in which like numerals are employed to designate like parts throughout the same:

Figure 1 is a side elevation of a fish pole showing an embodiment of my invention associated therewith.

Figure 2 is an enlarged, fragmentary sectional elevation thereof.

Figure 3 is a section taken on line 3—3 of Figure 2.

Figure 4 is a section taken on line 4—4 of Figure 2.

Figure 5 is a fragmentary view showing a modified form of my invention.

Referring to the drawings in detail, the numeral 1 designates a fish pole having secured thereto intermediate its ends a carrier element indicated generally by the numeral 2. The carrier element 2 consists of a head or body portion 3 which is formed centrally thereof with a pair of spaced bracket members 4, and the ends 5 of which are arcuate in cross section to conform in contour to the periphery of the pole 1. The element 2 is secured to the pole 1 by means of a pair of annular bands 6, which encircle the pole 1 and which fit over the arcuate ends 5. The bracket members 4 are offset inwardly, as indicated at 7, with respect to the head 3.

Pivotally supported by the bracket members 4, by means of a screw 8 which extends through an aperture formed in each bracket member, is a trigger element indicated generally by the numeral 9. The trigger element 9 consists of a relatively long arm 10 and a relatively short arm 11 extending substantially at a right angle thereto. The screw 8 extends through the element 9 at the point of mergence between the arms 10 and 11.

The trigger element 9 is further formed with a stop 12 which is oppositely disposed with respect to the arm 10 and which is formed with an arcuate face 13 on the side thereof facing the arm 11. Formed on the outer end of the arm 11 is a nose 14 which is oppositely disposed with respect to the arm 10 and which is adapted for engagement with a notch 15 formed in the lower surface of a latch member 16. The notch 15 is spaced from the inner end 17 of the latch member 16 and such inner end is disposed in proximity to the stop 12 when the nose 14 is in engagement with the notch 15.

The opposite end of the latch member 16 is formed with an opening 18 to provide for the connection of the latch member with a tension element, such as a spring 19, one end of which is secured to the pole 1, preferably by means of a band 20. Spaced from the opening 18, the latch member 16 is formed with an opening 19' to provide for the attachment with the latch member of a fish line 21. The free end portion of the arm 10 is formed with a plurality of spaced openings 22, through which the fish line 21 is adapted to be selectively extended. The openings 22 are preferably graduated in size from that opening nearest the free end of the arm 10 in order to provide for the use of lines of different sizes. Secured to the line 21, between the arm 10 and latch member 16, is a stop element such as a ring 23. The ring 23 is of greater diameter than the diameter of the opening 22 through which the line 21 extends, whereby the stop element is always maintained between the arm 10 and latch member 16. The free end of the line 21 is passed through a guide 24 carried by the end of the pole 1 and is adapted to have connected therewith a hook of any well known type, not shown.

The nose 14 is normally held in engagement with the notch 15 by means of a trigger spring which is preferably in the form of a length of wire having a pair of angularly disposed portions 25 and 26. The portion 25 extends through a groove 27 formed in the inner face of a nut 28 which is threaded on the outer end of the screw 8 and holds the trigger element 9 in position. Spaced from the free end thereof, the portion 25 is formed with a right angular offset 29 which terminates in a re-offset 30 disposed in parallel relation to the plane of the portion 25. The portion 25 is extended along the outer face of one of the bracket members 4 and the offset 29 is extended through an opening formed in such bracket member, whereby the re-offset 30 is extended along the inner face of such bracket member. The portion 26 bears against a pin 32 which extends through the arm 11 and projects laterally from both sides thereof. The pin 32 is fixedly secured to the arm 11 adjacent the nose 14. The engagement of the portion 26 with the pin 32 forces the nose 14 into engagement with the notch 15 and latches the trigger element 9 with the latch member 16. The band 20 is appropriately spaced from the carrier element 2 to provide for suitable tension of the tension element 19 when the latch member 16 is in engagement with the trigger element 9.

In the use of my improved fish catch, the latch member 16 is inserted between the bracket members 4 until the notch 15 is engaged by the nose 14 of the arm 11, due to the pressure of the spring portion 26 on the pin 32. The arcuate face 13 of the stop 12 permits the latch member to be inserted between the member 4 for a substantial distance without coming in contact with the stop. When a fish strikes at the end of the line 21 the ring 23 is brought into contact with the arm 10 by means of which the nose 14 is withdrawn from the notch 15, thereby releasing the tension element 19 and causing the latter to impart a sudden jerking movement on the line 21, by means of which the striking fish is caught on the hook adapted to be carried by the line 21. The movement of the trigger element about its pivot is limited by the stop 12, which abuts against the outer face of the head 2, thereby preventing any undue strain from being imparted to the spring portion 26 and also maintaining the arm 10 substantially perpendicular to the line 21 to prevent any binding action between the line and the wall of the opening 22 through which the line extends.

When the latch member 16 is released from the trigger element 9, the action of the tension element 19 withdraws the ring 23 a substantial distance from the arm 10 whereby the line 21 may pass freely to and fro through the opening 22 with which it is associated. In this manner the line 21 is yieldingly anchored to the pole 1 and the likelihood of the fish breaking the line or tearing the hook from its mouth in its fight for liberty is reduced to a minimum.

By hitching the ring 23 into the line 21, the length of that portion of the line extending between the ring 23 and latch member 16 may be varied as desired and the degree of force exerted on the line 21 by the tension element 19 will be correspondingly varied. Also by adjusting the length of that portion of the line between the ring 23 and the latch member 16, the line may be selectively associated with the openings 22 in order to reduce or increase as desired the force necessary to be exerted on the hook end of the line to disengage the trigger element 9 from the latch member 16.

In the embodiment illustrated in Figure 5, a reel 33 of any well known construction is secured to the base of the pole 1, upon which a fish line 34 is wound in the usual manner. In this embodiment, a relatively short jerk line 35 is secured at one end to the latch member 16 and at the other end to a ring 36. The line 34 extends from the reel 33 through the ring 36 and one of the openings 22 in the arm 10. Between the reel 33 and ring 36, an obstruction, such as a knot 37 is provided in the line 34, by means of which any pull exerted on the jerk line 35 by the spring 19 will be transmitted to the line 34. The knot 37 may be positioned at any point desired to permit the required length of the line 34 to extend through the arm 10 and in landing a fish, the line may freely pass through the opening 22 and ring 36 and the knot 37 will be carried to the reel 33 as the line 34 is wound thereon.

It is thought that the many advantages of a fish catch in accordance with this invention will be readily apparent, and although the preferred embodiments of the invention are illustrated and described, yet it is to be understood that various changes in the details of construction may be made, which fall within the scope of the invention as defined in the appended claims.

What I claim is:

1. A device of the character described comprising, a carrier element adapted to be connected with a fish pole and formed with a pair of spaced bracket members, a trigger pivotally supported by said bracket members and formed with a pair of angularly disposed arms, one of said arms being formed with a plurality of spaced openings and the other of said arms having a nose, a latch member for insertion between said bracket members and formed with a notch, a tension element secured to said latch member and adapted to be anchored to the pole, a fish line secured to said latch member and extending through one of said openings, a stop member carried by the line between the latch member and the arm formed with the openings, and means for latching said nose in engagement with said notch.

2. A device of the character described comprising, a carrier element adapted to be connected with a fish pole and formed with a pair of spaced bracket members, a trigger pivotally supported by said bracket members and formed with a pair of angularly disposed arms, one of said arms being formed with a plurality of spaced openings and the other of said arms having a nose, a latch member for insertion between said bracket members and formed with a notch, a tension element secured to said latch member and adapted to be anchored to the pole, a fish line secured to said latch member and extending through one of said openings, a stop member carried by the line between the latch member and the arm formed with the openings, and means for latching said nose in engagement with said notch, said means including a resilient element formed with a pair of angularly disposed portions, one of said portions being engaged with one of said bracket members and the other of said portions bearing on said arm formed with the nose.

3. A device of the character described comprising, a carrier element adapted to be connected with a fish pole and formed with a pair of spaced bracket members, a trigger pivotally supported by said bracket members and formed with a pair of angularly disposed arms, one of said arms being formed with a plurality of spaced openings and the other of said arms having a nose, a latch member for insertion between said bracket members and formed with a notch, a tension element secured to said latch member and adapted to be anchored to the pole, a fish line secured to said latch member and extending through one of said openings, a stop member carried by the line between the latch member and the arm formed with the openings, and means for latching said nose in engagement with said notch, said stop member being adjustable longitudinally of the line to provide for the selective association of the latter with said spaced openings.

4. A device of the character described comprising, a carrier element adapted to be connected with a fish pole and formed with a pair of spaced bracket members, a screw extending through said bracket members transversely thereof, a trigger pivotally mounted on said screw and having an arm formed with a nose, a nut threaded on the end of the screw and formed in its inner face with a groove, a latch member for insertion between said bracket members and formed with a notch, a tension element secured to said latch member and adapted to be anchored to the pole, a fish line secured to said latch member and operatively connected with said trigger, and means for latching said nose in engagement with said notch, said means including a resilient element formed with a pair of angularly disposed portions, one of said portions extending through said groove and having its outer end in engagement with one of said bracket members and the other of said portions bearing on said arm.

5. A device of the character described comprising, a carrier element adapted to be connected with a fish pole and formed with a pair of spaced bracket members, a trigger pivotally supported by said bracket members and formed with a pair of angularly disposed arms, a latch member for insertion between said bracket members, a resilient element connecting said latch member with the pole, means for releasably engaging said latch member with one of said arms, a fish line secured to said latch member and having means for engagement with the other of said arms to provide for a pivotal movement of said trigger to release said latch member upon an outward pull being exerted on said line, and means for limiting the pivotal movement of said trigger.

6. A device of the character described comprising, a carrier element adapted to be connected with a fish pole and formed with a pair of spaced bracket members, a trigger pivotally supported by said bracket members and formed with a pair of angularly disposed arms, a latch member for insertion between said bracket members, a resilient element connecting said latch member with the pole, means for releasably engaging said latch member with one of said arms, a fish line secured to said latch member and having means for engagement with the other of said arms to provide for a pivotal movement of said trigger to release said latch member upon an outward pull being exerted on said line, means for limiting the pivotal movement of said trigger, and a stop on said trigger, oppositely disposed with respect to said last mentioned arm, for engagement with said carrier element to limit the pivotal movement of said trigger.

7. A device of the character described comprising, a carrier element adapted to be connected with a fish pole, a trigger pivotally supported by said carrier element and formed with a pair of angularly disposed arms, one of said arms being formed with a plurality of spaced openings and the other of said arms having a nose, a latch member formed with a notch engaging said nose, a tension element secured to said latch member and adapted to be anchored to the pole, a fish line secured to said latch member and extending through one of said openings, and a stop member carried by the line between the latch member and the arm formed with the openings.

8. A device of the character described comprising, a carrier element adapted to be connected with a fish pole, a trigger pivotally supported by said carrier element and formed with a pair of angularly disposed arms, one of said arms being formed with a plurality of spaced openings, a latch member in latching engagement with the other of said arms and adapted to be anchored to the pole, a fish line secured to said latch member and extending through one of said openings, and a stop member carried by the line between the latch member and the arm formed with the openings.

In testimony whereof, I affix my signature hereto.

ABEL F. SHIREMAN.